US007730086B1

(12) United States Patent
Phoha et al.

(10) Patent No.: US 7,730,086 B1
(45) Date of Patent: Jun. 1, 2010

(54) DATA SET REQUEST ALLOCATIONS TO COMPUTERS

(75) Inventors: Vir V. Phoha, Ruston, LA (US);
Sitharama S. Iyengar, Baton Rouge, LA (US); Rajgopal Kannan, Baton Rouge, LA (US)

(73) Assignees: Louisiana Tech University Foundation, Inc., Ruston, LA (US); Board of Supervisors of Louisiana State University Agricultural and Mechanical College on Behalf of the Louisiana State University Health Sciences Center, New Orleans, LA (US)

( * ) Notice: Subject to any disclaimer, the term of this patent is extended or adjusted under 35 U.S.C. 154(b) by 507 days.

(21) Appl. No.: 11/670,113

(22) Filed: Feb. 1, 2007

Related U.S. Application Data

(63) Continuation of application No. 10/073,453, filed on Feb. 11, 2002, now Pat. No. 7,191,178.

(51) Int. Cl.
*G06N 3/02* (2006.01)
(52) U.S. Cl. .................. 707/776; 706/15; 706/25; 706/39
(58) Field of Classification Search .......... 707/776; 706/15
See application file for complete search history.

(56) References Cited

U.S. PATENT DOCUMENTS 5,333,238 A 7/1994 Kakazu et al.

6,108,648 A 8/2000 Lakshmi et al.
6,792,412 B1 9/2004 Sullivan et al.

OTHER PUBLICATIONS

Nageswara S.V. Rao, Vladimar Protopopescu, Reinhold C. Mann, E.M. Oblow and S. Sitharama Iyengar; "Learning Algorithms for Feedforward Networks Based on Finite Samples"; Jul. 1996; IEEE Transactions on Neural Networks, vol. 7, No. 4; pp. 926-940.
Vir V. Phoha and William J.B. Oldham; "Image Recovery and Segmentation Using Competitive Learning in a Layered Network"; Jul. 1996; IEEE Transactions on Neural Networks, vol. 7, No. 4; pp. 843-856.
Vir Virander Phoha; "Image Recovery and Segmentation Using Competitive Learning in a Computational Network"; Dec. 1992; A Dissertation.

*Primary Examiner*—Charles Rones
*Assistant Examiner*—Mellissa M Chojnacki
(74) *Attorney, Agent, or Firm*—Jones, Walker, Waechter, Poitevent, Carrere & Denegre

(57) ABSTRACT

A method of allocation a computer to service a request for a data set in a system having a plurality of computers. The method is implemented on a neural network having only an input layer having input nodes and an output layer having output nodes, where each output node is associated with a specific computer. Connecting the input nodes to the output nodes are weights w(j,k). The method includes the steps of receiving a request for data set "I" and inputting to the input layer a vector R(I)
  dependent upon the number of requests for the requested data over a predetermined period of time and
  selecting a computer assignment associated with of one of the output nodes to service the data request, where the output node selected is associated with a specific weight selected to minimize a predetermined metric measuring the distance between the vector entry R(I) and the weights(I,k).

10 Claims, 7 Drawing Sheets

Figure 4a:
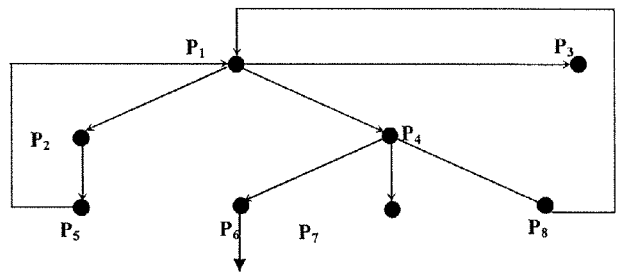
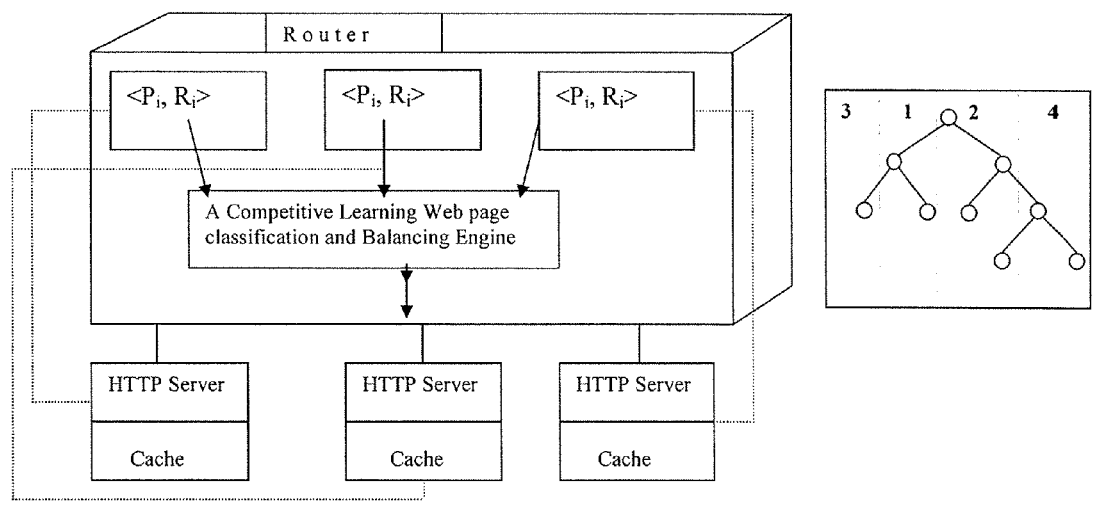
Figure 4b

Graph 1  Performance of page placement algorithm using competitive learning (Neural Network) versus Round Robin Algorithms (for Non-Uniform Input Data Distribution)

Graph 2 Performance of page placement algorithm using competitive learning (Neural Network) versus Round Robin Algorithms (for Uniform Input Data Distribution)

DATA SET REQUEST ALLOCATIONS TO COMPUTERS

This application is a continuation application of U.S. application Ser. No. 10/073,453 filed on Feb. 11, 2002, and claims the priority benefit thereof and which is incorporated by reference herein in its entirety.

(a) TITLE OF INVENTION

Method of Allocation of Web Pages Using Neural Networks

(b) CROSS-REFERENCE TO RELATED APPLICATIONS

Not applicable.

(c) STATEMENT REGARDING FEDERALLY SPONSORED RESEARCH

Not applicable.

(d) INCORPORATION-BY-REFERENCE OF MATERIAL ON CD

Not applicable

(e) BACKGROUND OF THE INVENTION (1) Field of Invention

The invention relates to methods of allocating page requests to servers on a web farm and, more particularly, to using a neural network to allocate page requests to web farm servers.

(2) Description of Related Art

The World-Wide-Web offers tremendous opportunities for marketers to reach a vast variety of audiences at less cost than any other medium. Recent studies have shown that the web consumes more Internet bandwidth than any other application. With huge amount of capital invested in these sites, it has become necessary to understand the effectiveness and realize the potential opportunities offered by these services.

The number of Web sites on the Internet has grown from an estimated 11,000 sites in 1994 to over 4 million in 2000. The traffic load on the web site is normally measured in terms of the number of http requests handled by the web site. Web sites with heavy traffic loads must use multiple servers running on different hardware; consequently this structure facilitates the sharing of information among servers through a shared file system or via a shared data space. Examples of such a system include Andrews file system (AFS) and distributed file system (DFS). If this facility is not there, then each server may have its own independent file system.

There are four basic approaches to route requests among the distributed Web-server nodes: (1) client-based, (2) DNS-based, (3) dispatcher-based, and (4) server-based. In the client-based approach, requests can be routed to any Web server architecture even if the nodes are loosely connected or are not coordinated. The routing decisions can be embedded by the Web clients like browsers or by the client-side proxy servers. For example, Netscape spreads the load among various servers by selecting a random number i between 1 and the number of servers and directs the requests to the server www.netscape.com. This approach is not widely applicable as it is not easily scalable and many Web sites do not have browsers to distribute loads among servers. However, client-side proxy servers require modifications on Internet components that are beyond the control of many institutions that manage Web server systems.

In the DNS based systems, by translating from a symbolic name to an IP address, the DNS can implement a large set of scheduling policies. The DNS approach is limited by the constraint of 32 Web servers for each public URL because of UDP packet size constraints although it can be scaled easily from LAN to WAN distributed systems.

In the dispatcher-based approach, one single entity controls the routing decisions and implemented through a wide variety of algorithms. Dispatcher failure can disable the system. However, as a centralized controller, the dispatcher can achieve fine-grained load balancing.

The server-based approach can be viewed as a combination of the DNS approach and the dispatcher approach. In the server-based approach, two levels of dispatching are used: (1) cluster DNS first assigns a client request to a Web server; and (2) each Web server may reassign the request to any other server of the cluster. It can achieve the fine-grained control on request assignments as the dispatcher approach and reduces the impact of a central dispatcher failure, but redirection mechanisms typically increase the latency time perceived by the users.

Only the Internet2 Distributed Storage Infrastructure Project (I2-DSI) proposes a "smart" DNS that uses network proximity information such as transmission delays in making routing decisions, as proposed by M. Beck, T. Moore, "The Internet2 Distributed Storage Infrastructure Project: An architecture for Internet content channels," Proc. Of $3^{rd}$ Workshop on WWW Caching, Manchester, England, June 1998.

Traditionally, scheduling algorithms for distributed systems are not generally applicable to control Web server clusters because of the non-uniformity of load from different client domains, high variability of real Web workload, and a high degree of self-similarity in the Web requests. The Web server load information becomes obsolete quickly and is poorly correlated with future load conditions. Further, because the dynamics of the WWW involves high variability of domain and client workloads, exchange of information about the load condition of servers is not sufficient to provide scheduling decisions. What is needed is a real time adaptive mechanism that adapts rapidly to changing environment. However, none of the approaches incorporates any kind of intelligence or learning in routing of Web requests.

Further, in any routing scheme, request turn around time (time to service the request) can be greatly decreased if the server chosen to respond to a request has the requested file in that server's cache memory. For instance, requests encrypted using Secure Socket Layer (SSL) use a session key to encrypt information passed between a client and a server. Since session keys are expensive to generate, each SSL request has a lifetime of about 100 seconds and requests between a specific client and server within the lifetime of the key use the same session key. So it is highly desirable to route the requests multiple requests from the same client to a server be routed to the same server, as a different server may not know about the session key, and routing to the same server increases the probability that the prior request is still in the systems cache memory, further decreasing the time required to service the user request. One proposal that combines caching and server replication for client-side proxy servers is given by M. Baentsch, L. Baum, G. Molter, "Enhancing the Web's infrastructure: From caching to Replication," IEEE Internet Computing, Vol. 1, No. 2, pp. 18-27, March-April 1997. However, a general scheme to increase the probability that the server chosen to service a particular request has the request page in cache is not presently available.

(f) BRIEF SUMMARY OF THE INVENTION

It is an object of the invention to provide a technique of servicing file requests on a web farm to increase the probability that the server selected to service the file request will have the requested file in cache.

It is an object of the present invention to provide a routing system that reduces or eliminates the need for client side caching.

It is an object of the invention to assist load balancing across the servers in a web farm.

The invention is a system to route requests in a web farm through the use of a routing algorithm utilizing a neural network with at least two layers, an input layer and an out put layer. The input layer corresponds to the page identifiers $P(j)$ and a function of the number of requests for that specific page $R(P(j))$ over a period of time. The outputs are the servers, $S(i)$. A particular server $S(K)$ is chosen to service a particular page request $P(J)$ by minimizing (over i), using a suitable metric, the "distance" between $R(P(J))$ and $w(i,J)$, where $w(i,j)$ is the set of weights connecting the input layer nodes to the output layer nodes. The neural weight $w(J,K)$ is then updated, using a neighborhood function and a balancing function. The preferred update neighborhood function is defined to be a gradient descent rule to a corresponding energy function. Heuristics to select parameters in the update rule that provide balance between hits and load balancing among servers are included.

Simulations show an order of magnitude improvement over traditional DNS based load-balancing approaches. More specifically, performance of our algorithm ranged between 85% to 98% hit rate compared to a performance range of 2% to 40% hit rate for a round robin scheme when simulating real Web traffic. As the traffic increases, our algorithm performs much better than the round robin scheme. A detailed experimental analysis is presented in this paper.

(g) BRIEF DESCRIPTION OF THE DRAWINGS

FIG. 4*a* shows a cluster of web pages on a site.

FIG. 4*b* show the framework of the invention, routing requests through a neural network.

Figure 5:
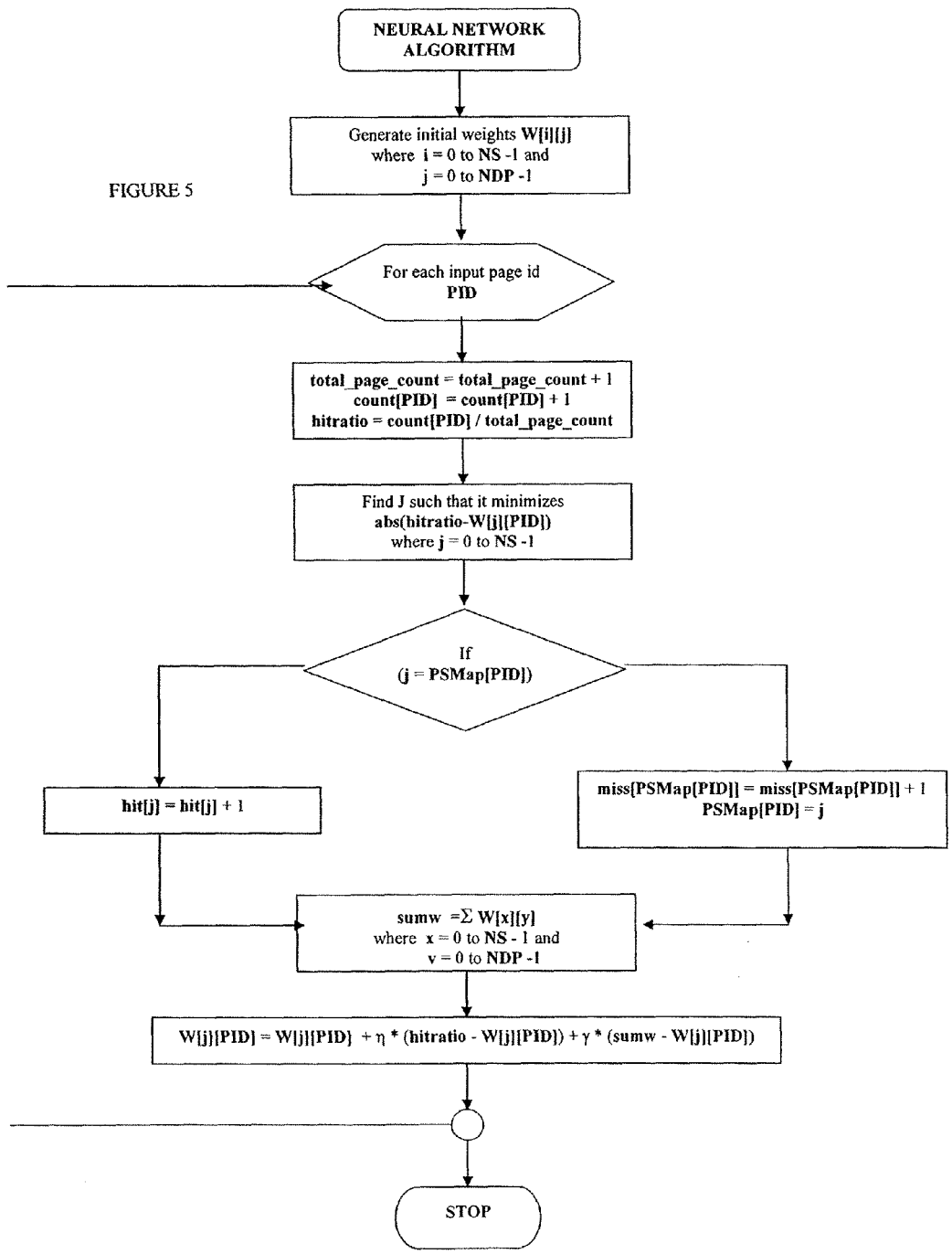

FIG. 5 is a flowchart showing implementation of one embodiment of the invention.

Figure 6:
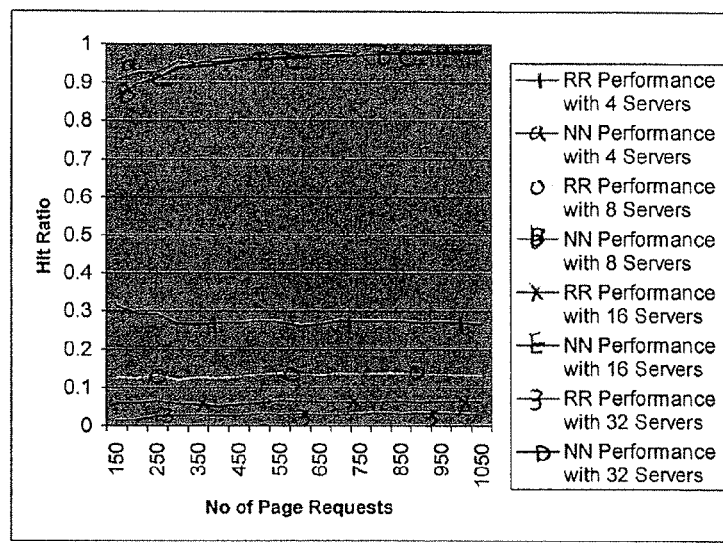

FIG. 6 shows a graph 1 depicting the performance of page placement algorithm using competitive learning (Neural Network) versus Round Robin Algorithms (for Non-Uniform Input Data Distribution)

Figure 7:
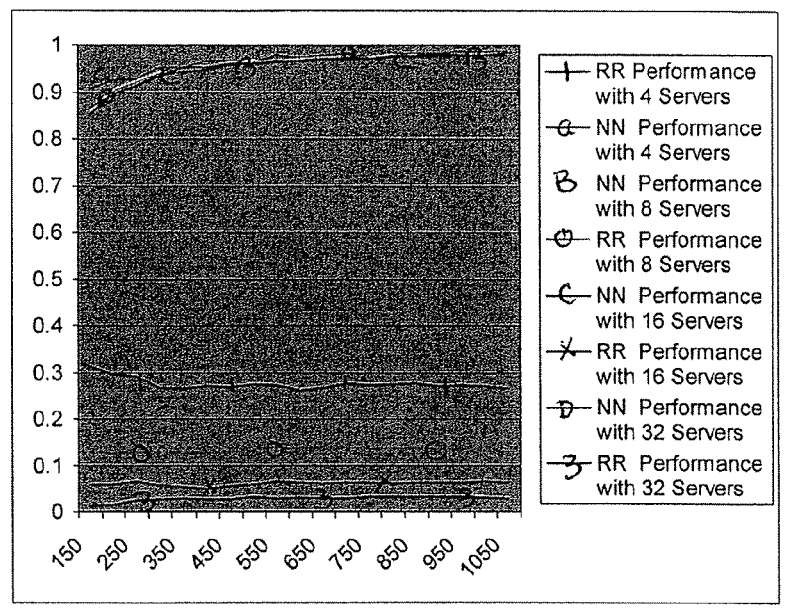

FIG. 7 shows graph 2 depicting the performance of page placement algorithm using competitive learning (Neural Network) versus Round Robin Algorithms (for Uniform Input Data Distribution)

(h) DETAILED DESCRIPTION OF THE INVENTION

As used in this application, a Web server farm or a server cluster, refers to a Web site that uses two or more servers to service user requests. Typically, a single server can service user requests for the files (such as pages) of a Web site, but larger Web sites may require multiple servers. The Web farm servers do not have to be physically located at a common site. A Web faun also refers to an ISP (interne service provider) that hosts sites across multiple servers, or that may store frequently requested pages across more than one server to reduce the time to service a user request for these pages.

The servers in a web farm may have individual operating systems or a shared operating system and may also be set up to provide load balancing when traffic to the web site is high. In a server farm, if one server fails, another can act as backup.

Figure 1:
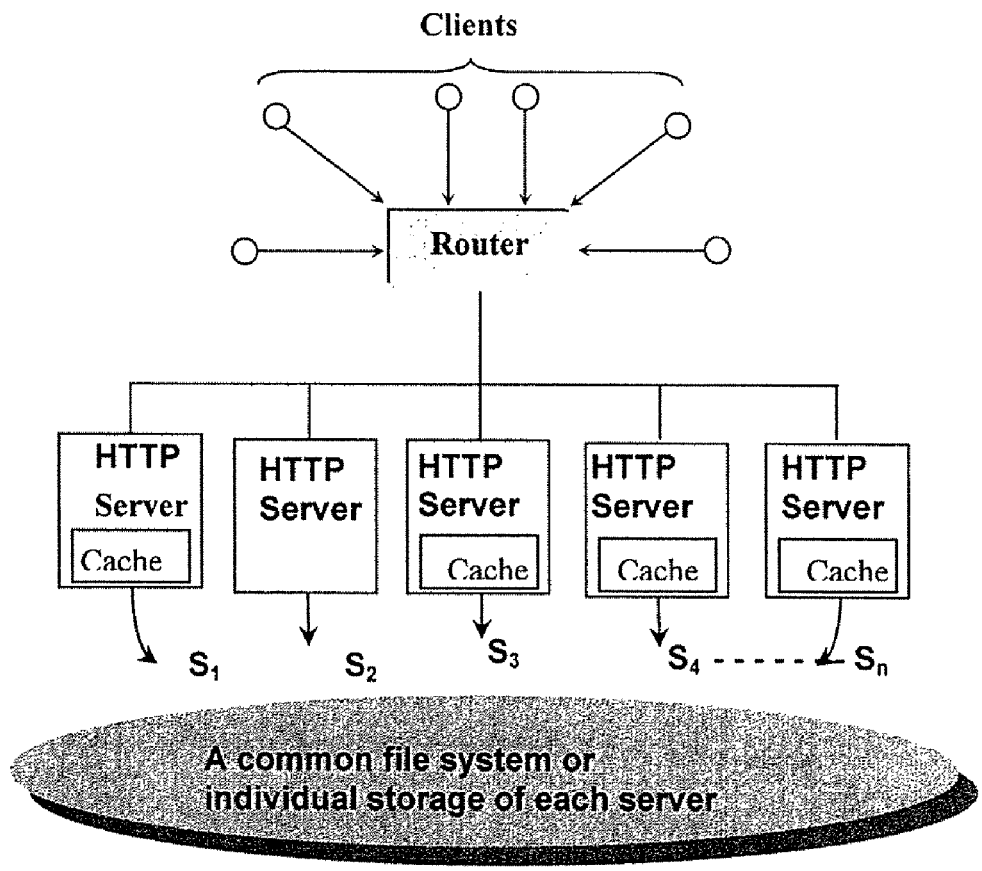
FIG. 1 shows a schematic of a general web farm using a router to distribute requests to the servers in the web farm.

Web farms or clusters typically have a single machine or interface acting to distribute (dispatch) the file requests to servers in the farm. Such a single machine will be termed a proxy-server (proxy for the entire site), or a router. An example of such a system is shown in FIG. 1. FIG. 1 shows an example of this type of system, where requests may come from various client sites 1 to the router 2, which then pools the requests and directs them to a specific server 3. Here the servers $S_1 \ldots S_n$ each have their own cache memory 4 and may share a common file system 5. Correspondingly, each of these servers may have their individual storage. The router decides the allocation of web page request to individual servers, and then dispatches a particular request to a particular server. The router may be also be a server, which services particular requests.

In large systems or sites, router tasks may be undertaken by a plurality of machines or routers, and may include an organizational structure to allocate tasks amongst the routers. For instance, certain pages may only be available from a sub-set or cluster of the overall servers on the web farm. Input to each cluster may be made simultaneously, with only the cluster storing the requested file responding to the request. Alternatively, input to a servicing cluster may be determined by a master distributing router, which then allocates the serving cluster based upon some algorithm, such as the neural network algorithm described herein. Another way to view page clustering is to group "related" pages into a cluster, where the "relation" can be any predefined characteristic or characteristics, such as related content. In this instance, each cluster may have may have its own individual cluster gateway or router to distribute requests across the servers in the cluster.

Each server in the farm (and can include the gateway router itself) typically will have certain files stored in cache memory. When the server receives a request for a file, if the server finds the page in cache, it returns it to the user (through the gateway or directly to the user) without needing to forward the request to server's main memory or shared server file storage. If the page is not in the cache, server main memory, or common server memory, the server, acting as a proxy server, can function as a client (or have the router function as a client) on behalf of the user, to use one of its own IP addresses to request the page from a server remote from the Webfarm. When the page is returned, the proxy server relates it to the original request and forwards it on to the user.

In a proxy cache such as maintained by ISP's, clients request pages from a local server instead of directly from the source. The local server gets the page, saves it on disk and forwards it to the client. Subsequent requests from other clients get the cached copy, which is much faster (i.e. reduces latency time) and does not consume Internet bandwidth.

A client is defined as a program that establishes connections to the Internet, whereas a Web-server stores information and serves client requests. A distributed Web-server system or web farm is any architecture of multiple Web servers that has some means of spreading the client requests to the farm's servers. A session is an entire period of access from a single client to a given Web site. A session may issue many HTML page or file requests. Typically a Web page consists of a collection of objects, and an object request requires an access to a server.

The algorithm used in this invention is an aspect of competitive learning that will next be generally described.

Competitive Learning—Background

Figure 2:
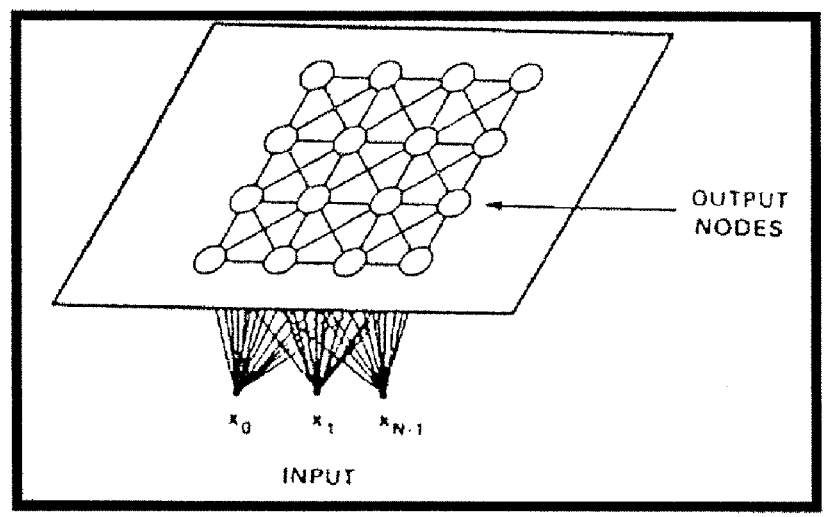
FIG. 2 shows a schematic depicting the general Kohonen network of an input layer, an output layer, and the weights connecting the two layers.

In the simplest competitive learning networks there is a single layer of output units $O_i$, or output nodes, each is fully connected to a set of inputs $x_i$ (input nodes) via connection weights $w_{ij}$ (generally $\exists 0$). A description of the algorithm follows. Such a system is shown in FIG. 2.

Let x be an input vector (with components $x_j$) to a network of two layers with an associated set of weights $w_{ij}$. The standard competitive learning rule is given by:

$$\Delta w^*_{ij} = \eta(x_j - w^*_{ij})$$

$\eta$ being a scalar. This rule "moves" $w_i^*$ towards $x_j$. The i* implies that only the set of weights corresponding to the winning nodes is updated. The winning node is taken to be the one with the largest output. Another way to write this is:

$$\Delta w_{ij} = \eta O_i(x_j - w_{ij}),$$

where:

$$O_i = \begin{cases} 1 & \text{for } i \text{ corresponding to the largest output} \\ 0 & \text{otherwise} \end{cases}$$

This is the adaptive Kohonen approach. The usual definition of competitive learning requires a winner-take-all strategy. In many cases this requirement is relaxed to update all of the weights in proportion to some criterion, such as in a neighborhood of "winning" node.

Kohonen's Algorithms adjusts weights from common input nodes to N-output nodes arranged in a 2-dimensional grid shown in FIG. 2, to form a vector quantizer. Input vectors are presented sequentially in time and certain of the weights are modified according to the update rule chosen, and the neural network evolves or learns. Kohonen's algorithm organizes weights such that "close" nodes are sensitive to physically similar inputs. A detailed description of this algorithm follows.

Let $x_1, x_2, \ldots, x_N$ be a set of input vector components, which defines a point in N-dimensional space. The output units $O_i$ are arranged in an array and are fully connected to input via the weights $w_{ij}$. A competitive learning rule is used to choose a "winning" weight vector $w_i^*$, such that, for each j, $$|w_i^* - x_j| <= |w_{ij} - x_j| \text{ for all } i,$$

For instance, in the case of a two component vector x, ($x_1$ and $x_2$) and three outputs, with six corresponding weights $w_{ij}$ i=1,3; j=1,2 (fully connecting the input vector to the outputs), Kohonen's algorithm chooses the minimum of the following 3 "distances" (using the $l_2$ norm):

$(x_1-w_{11})2+(x_2-w_{12})2$ (and correspondingly updating $w_{11}$ and $w_{12}$);

$(x_1-w_{21})2+(x_2-w_{22})2$ (and correspondingly updating $w21$ and $w_{22}$); or $(x_1-w_{31})2+(x_2-w_{32})2$ (and correspondingly updating $w_{31}$ and $w_{32}$)

with the Kohonen's update rule generally given by:

$$\Delta w_i^* = \eta h(j,i^*)(x_j - w_{i*i}^{Old}) \text{ for each j}$$

Here h(j, i*) is a neighborhood function such that h(j,i*)=1 if j=i* but falls off with distance $|r_j - r_{i^*}|$ between units j and i* in the output array. The winner and "close by" weights are updated appreciably more than those further away. A typical choice for h(j, i*) is:

$$e^{-\left(\left|r_j^{r*} - r_i^{r*}\right|/2\sigma^2\right)},$$

where $\sigma$ is a parameter that is gradually decreased to contract the neighborhood. $\eta$ is decreased to ensure convergence.

Figure 3:
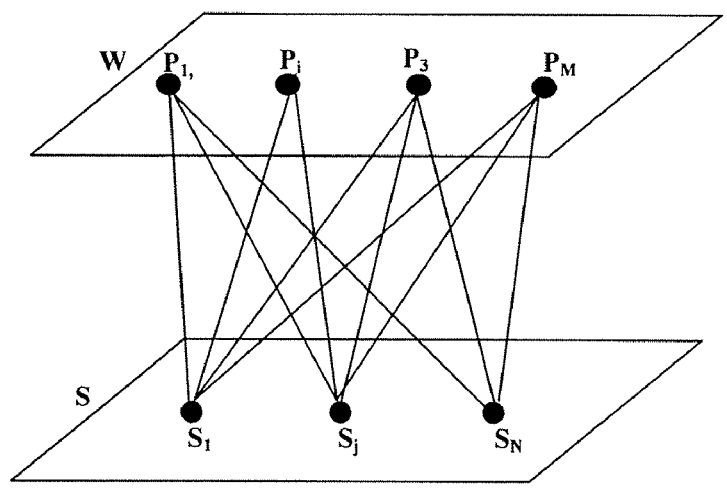
FIG. 3 shows a simplified Kohonen network.

The allocation rule used in the present invention is a modification of the traditional Kohonen Rule and will be described in a Web farm having N servers that service the requests for Web pages or files (files and pages are used interchangeably to identify a data set which is accessible through the site server/router or gateway via an identifying address) where the servers are identified as $S_1, \ldots, S_N$, as shown in FIG. 3.

As described, the Web-server farm is scalable and uses one URL to provide a single interface to users. For example, a single domain name may be associated with many IP addresses and each address may belong to a different Web server. The collection of Web servers is transparent to the users. In the current invention, the input vector to the input layer consists of a function of the page requests and the page identifier and the output layer consists of the server identification.

Each request for a Web page is identified as a duplet <$P_i$, $R_i$> where $1 \leq i \leq M$, M being the number of requests (pages, objects or files) serviced by the Web farm at a predetermined time (if the farm is clustered, M could be the number of pages in the cluster, and the algorithm would be implemented by the cluster gateway or cluster router). P represents the page identifier, and R represents a function of the number of requests for that page over a predetermined period of time. The dispatching algorithm may deal only with a subset of the total number of pages of files in the Web farm (such as the most frequently accessed pages); how many pages to use in the algorithm is design decision, and in simulations, a range from 20 to 1000 was used. Requests are handled through the router (which may be a server or proxy-server in the web farm). The router will act as the dispatcher, routing a request either to a particular server, or a cluster router for further handling.

FIG. 4 presents a conceptual framework of the proposed model. Initially, we treat the web site as a connected graph, as shown in FIG. 4a. Viewing the web site as a connected graph, such as in FIG. 4a, each node of the connected graph corresponds to a web page and links between the pages are the path between the nodes. This directed graph can be translated into a tree structure (shown in FIG. 4c) using some rule. For instance, a tree structure can be determined so that an in-order traversal of this tree would output web pages sorted in order of decreasing page requests.

The collection of Web pages can be partitioned in to clusters in several ways. One approach is grouping the pages such that the average hit count is similar among different clusters to assist in load balancing between clusters. Another way is to group pages according to a relationship between page content, page links, or other interpage relationship to assist in reducing access latency time. One way to group pages into clusters is to partition the tree structure into left subtree and right subtree and allocate the subtrees to the clusters, such as shown in FIG. 4c, where 4 clusters are formed. Obviously, the way clusters are formed will have an effect on allocation of pages to servers, for hopefully, clustered pages will be found on the same server. For purposes of simplification and further discussion, assume that each page is its own cluster (that is, that a cluster has only one page associated with the page ids) and has an associated request count.

In the simplified structure shown in FIG. 4b, we have one page per cluster, and the neural network's inputs layer's nodes are associated with the page identifiers, $P_i$. The vector input to the input layer, for a particular page $P_k$ will be a vector where all entries are zero other than the $K^{th}$ entry corresponding to the particular page request $P_k$, and the value for this vector component will be a function of the number of requests for that particular page $R_k$ as measured from some pre-determined time. In essence, we now have the pages P and the associated request count R with the following one page per cluster structure $$\{<P_1, R_1>\} \ldots \{<P_i, R_i>\} \ldots \{<P_m, R_m>\}$$

that has to be mapped into the server farm. Initial allocation of clusters to the servers is based on some initial configuration of clusters.

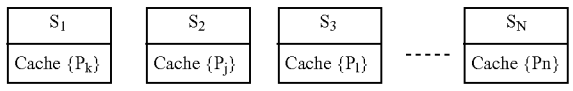

The process now is to create connection to servers to "learn" the mapping from the pages to the server and to adapt to changes in the mapping.

Mathematical Formulation Using Competitive Learning

The model uses a two layer neural network: layer W and layer S. Each node in the input layer W corresponds to a page id, and the layer S corresponds to server ids. Define the weight $w_{ij}$ as the connection "strength" from the page $P_i$, to server $S_j$. A pictorial representation of this architecture is given in FIG. 3.

Now we can formulate the problem of assigning web pages to the servers as a mapping for the placement of $<P_i, R_i> \in W$ onto a server space S as $$\varnothing_k: W \to S, \text{ such that } P_i \in W \to S_j \in S; (i=1, M \text{ and } j=1, N)$$

with the condition to allocate (classify) the pages ($P_i$) such that the pages are distributed substantially equally among the servers ($S_j$) to ensure equitable load among the servers and at the same time maximize the hits in the servers' cache in order to reduce latency and request service time. The objective is to optimize two things: (1) increase the number of hits, in the sense that a the server chosen to service the request has a high probability that the requested page is stored in cache, thereby accelerating the performance of the web site to allow fast response and fast loading of dynamic web pages; and (2) to distribute the page requests among the servers in such a fashion that the page requests are distributed equitably among the servers.

The server $S_k$ for a given page $P_m$ by using a modified Kohonen competitive learning selection is chosen as follows. Choose the server k such that $$|f(R_m) - w_{mk}| = \text{Min}(\text{dis}|f(R_m) - w_{mj}|) \text{ where } j=1,N \qquad (1)$$

Where "$R_m$" is the number of requests for the given page over a predetermined period of time (this period could be a rolling period, and may include in the count the current request), "f" is is some function of R, and "dis" is a distance measurement, as measured by some suitable metric, such as "absolute value" of the difference.

For instance, with two pages $P_1$ and $P_2$ and three servers $S_1$, $S_2$, and $S_3$, and weights $w_{ij}$, i=1,2, j=1,3, this modified rule chooses the server k for page request $P_1$ (with page request number $R_1$) as the minimum of the following three numbers, (using the function $f(R_i)=R_i$) and the metric=absolute value, or $l_1$ norm):

$\text{abs}(R_1 - w_{11})$ and update $w_{11}$;

$\text{abs}(R_1 - w_{12})$ and update $w_{12}$; or $\text{abs}(R_1 - w_{13})$ and update $w_{13}$ As an alternative $f(R_i)$ can be a "normalized" request count, such as $f(R_i) = R_i / \Sigma_j R_j$.

Learning is achieved by updating the connection strength between page and the winning server using the general update rule:

$$\Delta w_{ik} = \text{neighborhood function} + \text{load balancing function}.$$

For instance, a preferred update rule is as follows:

$$\Delta w_{ik} = \eta \Lambda(Ri, w_{ik}, K)(R_i - W_{ik}) + \alpha K((\Sigma W_{ir}) - N W_{ik}) \qquad (2)$$

The first term is the neighborhood function and the second term is a load balancing function. Here $\eta$, $\alpha$, and K are the parameters that determine the strength of controlling the maximum hit or balancing the load among the servers, and $\Lambda(Ri, w_{ik}, K)$ is given by $$\Lambda(Ri, w_{ik}, K) = \frac{e^{-g*g/(2*K*K)}}{\Psi(d, K)},$$

here $g = (R_i - W_{ik}), \Psi(d,K) = \Sigma_j e^{-d*d/(2*K*K)}$ and $d = (R_i - W_{ij}), j=1,N$ \qquad (3)

Integrating equation (2) and after some algebraic manipulations, an energy function is obtained $$E = \eta K \ln \Sigma_{m,k} e^{-d*d/2K*K} \alpha \Sigma_{m,k} (w_{i,j-1} + w_{i,j+1} - 4w_{i,j} + w_{i-1,j} + w_{i,j})2 \qquad (4)$$

Since the update rule given in equation (2) is of the form $$\frac{\partial E}{\partial w_{ik}}$$

the update rule is a gradient descent rule for the energy function given in equation (4).

Again, as can be seen by a close examination of equation 2, the neighborhood function, $\eta \Lambda(Ri, w_{ik}, K)(R_i - W_{ik})$, tends to drive the updated weight (i.e. $w_{ik} + \Delta w_{ik}$) toward the request count. The load balancing function, $\alpha K ((\Sigma W_{ir}) - N W_{ik})$, tends to drive the updated weight toward the average weight, that is, to equalize the weights (This particular load balancing function can be re-written as $(\alpha K N((\Sigma W_{ir})/N - W_{ik})$ or $(\alpha K N$ (average weight $- W_{ik}$)).

Note, in the given example of a single page per cluster, since only a single weight will be updated, the neighborhood function can be a constant. If the pages are clustered, then it may be appropriate to use a true neighborhood function, updating those weights directed to all servers in the cluster.

Heuristics on the Selection of Parameters

Ideally, the neighborhood function $\Lambda(Ri, w_{ik}, K)$ is 1 for $i=k$ and falls off with the distance $|R_i-w_{ij}|$ In general, the neighborhood is selected such that servers having related pages are "closer" in a neighborhood (furthering the likelihood of finding pages in cache). The first part on the right hand side of equation (2) pushes the selected weight $w_{ik}$, toward the request count $R_k$ thereby increasing the probability that page requests for pages that are in server $S_i$'s cache will be directed to the server $S_i$, (as then $dis(w_{ik},-R_k)$ should be minimum. The second term on the right of equation (2) increases the likelihood that no one server will get overloaded, that is, the page requests are distributed evenly among the servers. By a proper balance of the parameters $\eta$, $\alpha$, and K; we can direct the flow of traffic in an optimal fashion.

$\eta$, $\alpha$, and K are related as follows $$\eta \propto \frac{1}{\alpha K}$$

Higher $\eta$ and lower $\alpha K$ mean we stress page hits are emphasized over load balancing, while higher $\alpha K$ means more weight is given to load balancing. Putting $\alpha=0$ would mean increasing web page hits without regard for load balancing. In simulations, it has been found that a high hits are maintained using small values of $\alpha$ and still have reasonable load balancing among servers.

Simulation Using the Method for One Page One Cluster

An outline of the method implemented for simulation with one page per cluster follows and is flowcharted on FIG. 5:

1) Initialize M, N;
2) Initialize with random values the weights {wij} between the page requests and the servers and select parameters $\eta$ and $\alpha$.
3) While (there are no more page requests)

//begin while//

3.1) {Calculate|$(R_i/\Sigma R_j)-w_{ik}$| and select the K which minimizes this value 3.2) Determine whether the selected server is a "hit" or "miss". A hit is counted if the selected server was that server that serviced the previous request for this particular page. The assumption being that the server servicing the previous request is more likely to have the page still in cache memory that other servers. A "miss: is counted if the server selected does not correspond to the previously servicing server.

3.3) Update the server selection for this page request to correspond to the server chosen.

3.4) Update the weight using $\Delta w_{ik}=\eta(R_i-W_{ik})+\alpha((\Sigma W_{ic})-NW_{ik})$ Simulation Results The characteristics of Web traffic and the self similarity inherent in real Web traffic can be simulated by modeling the traffic through a heavy tailed distribution of the type $P[X>x]\sim x^{-\alpha}$ as $x\to\infty$ for $0<a<2$. The results correspond to Pareto distribution, with probability density function $p(x)=\alpha k^{\alpha}x^{-\alpha-1}$, where $\alpha=0.9$ and $k=0.1$. Data sets corresponding to use of the Pareto distribution for page requests are referred to as "Non-Uniform." For purposes of simulation, Web traffic was also simulated using a uniform probability distribution for the page requests, that is, each page is equally likely to be requested.

The neural network algorithm was compared using simulations to a Round Robin (RR), Round Robin 2 (RR2), and a special case of Adaptive TTL algorithm. In RR2 algorithm, a Web cluster is partitioned into two classes: Normal domains and Hot domains. This partition is based on domain load information. In this strategy, Round Robin scheme is applied separately to each of the domains. In the implementation of Adaptive TTL algorithm, a lower TTL value was assigned when a request is originated from hot domains and a higher TTL value is assigned when it originates from Normal domain, this way the skew on Web pages is reduced.

The simulations were run using a variety of values for the update parameters $\eta$ and $\alpha$. For instance, $\eta$ varied between 0.2 and 0.8, while $\alpha$ varied with the number of servers, as 1/#servers. In all cases, the results using the Neural Network implementation were similar showing a high initial hit ratio and converging on a hit ration of 1 as the number of requests increased. Because the variances in the results are minor, specific graphs for the various parameter values are not shown. The following table gives characteristics of the simulations.

TABLE 1

| Simulation Characteristics | |
| --- | --- |
| Sample Size | Number of Web pages ranged from 150 to 1050 and the statistics were collected at the intervals of 50 pages each. |
| Number of Servers | Statistics were collected for 4, 8, 16, 32 servers |
| Web Pages Distribution Used | Uniform and Non Uniform (Pareto) |
| Algorithms | Neural Network (NN) with $\eta$ varing between .2 and .8 and $\alpha$ varying with the number of servers as 1/#servers; Round Robin Round Robin 2 (RR), and Adaptive Time-to-Live |

The comparison charts in the following discussions relate only to Round Robin scheme and the Neural Net based algorithm. The results (hit ratios) for adaptive TTL algorithm varied widely for different input size of Web pages and for different input page distributions, but never ranged higher than 0.68. In these graphs, "Hit Ratio" corresponds to the following ration, where Hit=number of page requests to the "proper server"; and Miss=number of page requests to the "improper server"; Hit Ratio=Hit/(Hit+Miss).

As can be seen from Graph 1, shown in FIG. 6, the Neural Network (NN) competitive learning algorithm performs much better as compared to Round Robin schemes (also RR2, not shown) when input pages follow a Pareto distribution. As the number of input pages increase, the algorithm achieves a hit ratio close to 0.98, whereas the round robin schemes never achieved a hit ratio of more than 0.4.

For the neural network algorithm, hit ratios (0.86) with a smaller number of pages is attributed to some learning on the part of the algorithm, but as the algorithm learns, the hit ratio asymptotically stabilizes to 0.98 for larger number of pages.

For uniform distribution of input pages, NN algorithm performs similarly as for non-uniform distribution and is much better than the Round Robin schemes (See Graph 2 in FIG. 7).

TABLE 2

Comparison of maximum hit ratio achieved, input size, and servers

|  | RR | NN |
|---|---|---|
| Uniform | (0.31, 150, 4) | (0.98, 1050, 4) |
| Non-Uniform | (0.32, 150, 4) | (0.98, 1050, 4) |

Round Robin scheme never achieves a hit ratio higher than 0.32, where as NN achieves hit ratios close to 0.98 (See Table 2).

TABLE 3

Comparison of minimum hit ratio achieved, input size, and servers

|  | RR | NN |
|---|---|---|
| Uniform | (0.03, 1050, 32) | (0.85, 150, 32) |
| Non-Uniform | (0.02, 1050, 32) | (0.86, 150, 32) |

As a worst case, NN achieves a hit ratio of as high as 0.85 for 32 servers, where as RR schemes go as low as 0.02 hit ratio (See Table 3).

CONCLUSIONS

An analysis indicates the following results:

(1) The performance of the NN algorithm increases considerably (from 0.85 hit rate to 0.98 as compared to 0.02 to 0.38 for Round Robin scheme) as the traffic increases where as the performance of Round Robin decreases. This result holds true irrespective of the number of servers. This is a result of a push of a page towards the same server based on the learning component in equation (2).

(2) For uniform distribution of Web page requests and at a lower traffic rate with large number of servers (16 and 32), both the algorithms performance are acceptable. As the traffic increases the NN algorithm performs much better than the RR scheme.

(3) For a non-uniform distribution (Pareto distribution), the NN algorithm performs considerably better for lower and higher traffic rates and the performance irrespective of the number of servers.

For Pareto distribution, which closely models real Web traffic, better performance of the NN algorithm, at larger input rate of Web pages is a very attractive result.

We claim:

1. A method of assigning a computer to service a request for a data set, said method comprising the steps of:

(a) providing a neural network having only two layers, an input layer having J input nodes and an output layer having K output nodes, each of said output nodes associated with one computer out of a series of computers, and associated weights w(i,k) between each said input node and each said output node;

(b) receiving a request for particular data set;

(c) inputting to said input layer an input vector having an entry R(I) at input node I, said entry R(I) being dependent upon a number of requests for said particular data set over a predetermined period of time;

(d) selecting a computer associated with a selected one of said output nodes to service said data request, where said selected output node is associated with a specific weight, said specific weight selected to minimize a predetermined metric measuring a distance between said vector entry R(I) and said weights w(i,k), where i=I associated with said input node I and said output nodes;

(e) updating said specific weight with a predetermined update rule where said update rule comprises updating said specific weight with a first factor dependent on the distance between said specific weight and said entry R(I) and with a second factor for balancing the load across a selected subset of said output nodes where said second factor comprises beta*($\Sigma_m$w(I,m))−gamma*(w(I,k)), where beta and gamma are constants;

and (f) transmitting said request for said particular data set to said selected computer.

2. The method of claim 1 wherein said selected output node is associated with a neighborhood of other output nodes, and said step (e) of updating further includes the step of updating each said weight w(i,k) associated with each said output nodes in said associated neighborhood with a first function of the distance between said entry R(I) and said weight w(i,k) associated with each said output node in said neighborhood.

3. A method of assigning a computer to service a request for a data set, said method comprising the steps of:

(a) providing a neural network having only two layers, an input layer having J input nodes and an output layer having K output nodes, each of said output nodes associated with one computer out of a series of computers, and associated weights w(i,k) between each said input node and each said output node;

(b) receiving a request for particular data set;

(c) inputting to said input layer an input vector having an entry R(I) at input node I, said entry R(I) being dependent upon a number of requests for said particular data set over a predetermined period of time;

(d) selecting a computer associated with a selected one of said output nodes to service said data request, where said selected output node is associated with a specific weight, said specific weight selected to minimize a predetermined metric measuring a distance between said vector entry R(I) and said weights w(i,k), where i=I, associated with said input node I and said output nodes; said selected output node being associated with a neighborhood of other output nodes;

(e) updating said specific weight and each said weight w(i,k) associated with output nodes in said associated neighborhood of said selected output node with a predetermined update rule where said update rule comprises updating said weights w(i,k) with a first function dependent on the distance between said weight w(i,k) and said entry R(I); wherein said first function comprises $\exp(-(R(I)-w(i,k))^2)$ for each w(i,k) in said neighborhood;

and (f) transmitting said request for said particular data set to said selected computer.

4. The method of claim 1 wherein inputting to said input layer an input vector having an entry R(I) at input node I, wherein said R(I) is proportional to a the ratio of a number of previous requests for said particular data set to a number of previous requests for a subset of all requested data sets over said predetermined period of time.

5. A system comprising a plurality of computers, each having data sets stored thereon, one of said computers executing a method to service a request for a data set, said method comprising the steps of:

(a) providing a neural network having only two layers, an input layer having J input nodes and an output layer having K output nodes, each of said output nodes associated with one computer out of a series of computers, and associated weights w(i,k) between each said input node and each said output node;

(b) receiving a request for particular data set;

(c) inputting to said input layer an input vector having an entry R(I) at input node I, said entry R(I) being dependent upon a number of requests for said particular data set over a predetermined period of time;

(d) selecting a computer associated with a selected one of said output nodes to service said data request, where said selected output node is associated with a specific weight, said specific weight selected to minimize a predetermined metric measuring a distance between said vector entry R(I) and said weights w(i,k), where i=I associated with said input node I and said output nodes;

(e) updating said specific weight with a predetermined update rule where said update rule comprises updating said specific weight with a first factor dependent on the distance between said specific weight and said entry R(I) and with a second factor for balancing the load across a selected subset of said output nodes where said second factor comprises beta*($\Sigma_m$w(I,m)−gamma*(w(I,k)), where beta and gamma are constants;

and (f) transmitting said request for said particular data set to said selected computer.

6. The system of claim 5 wherein said system further comprises a proxy server, and said method is implemented on said proxy server.

7. The system of claim 5 wherein said plurality of computers is organized into a web farm of servers.

8. The system of claim 7 wherein said system further comprises a router and said method is implemented on said router.

9. A computer readable storage medium containing computer executable code for performing a method of assigning a computer from a system of computers to service a request for a data set, said method comprising the steps (a) providing a neural network having only two layers, an input layer having J input nodes and an output layer having K output nodes, each of said output nodes associated with one of said computers, and associated weights w(i,k) between each said input node and each said output node;

(b) receiving a request for particular data set;

(c) inputting to said input layer an input vector having an entry R(I) at input node I, said entry R(I) being dependent upon a number of requests for said particular data set over a predetermined period of time;

(d) selecting a computer associated with a selected one of said output nodes to service said data request, where said selected output node is associated with a specific weight, said specific weight selected to minimize a predetermined metric measuring a distance between said vector entry R(I) and said w(i,k), where i=I associated with said input node I and said output nodes;

(e) updating said specific weight with a predetermined update rule where said update rule comprises updating said specific weight with a first factor dependent on the distance between said specific weight and said entry R(I) and with a second factor for balancing the load across a selected subset of said output nodes where said second factor comprises beta*($\Sigma_m$(I,m)−gamma*(w(I,k)), where beta and gamma are constants;

and (f) transmitting said request for said particular data set to said selected computer.

10. The method of claim 2, wherein said first function comprises $\exp(-(R(I)-w(i,k))^2)/(\Sigma_j \exp(-Dis(R(I)-w(i,j))))$ for each w(i,j) and w(I,k) in said neighborhood.

* * * * *

UNITED STATES PATENT AND TRADEMARK OFFICE
CERTIFICATE OF CORRECTION

| | | |
|---|---|---|
| PATENT NO. | : 7,730,086 B1 | Page 1 of 1 |
| APPLICATION NO. | : 11/670113 | |
| DATED | : June 1, 2010 | |
| INVENTOR(S) | : Vir V. Phoha, Sitharama S. Iyengar and Rajgopal Kannan | |

It is certified that error appears in the above-identified patent and that said Letters Patent is hereby corrected as shown below:

On the title page, item 73, should read Louisiana Tech University Foundation, Inc., Ruston, LA (US); The Board of Supervisors of Louisiana State University and Agricultural and Mechanical College, Baton Rouge, LA (US)

Signed and Sealed this
Twelfth Day of July, 2011

David J. Kappos
*Director of the United States Patent and Trademark Office*